United States Patent [19]

Willinger et al.

[11] Patent Number: 5,176,824
[45] Date of Patent: Jan. 5, 1993

[54] AEROBIC AQUARIUM FILTER CHAMBER

[75] Inventors: Allan H. Willinger, Oakland; Klaus Woltman, Demarest; Jonathan Willinger, Oakland, all of N.J.

[73] Assignee: Willinger Bros., Inc., Oakland, N.J.

[21] Appl. No.: 893,943

[22] Filed: Jun. 4, 1992

Related U.S. Application Data

[63] Continuation of Ser. No. 562,081, Aug. 2, 1990, abandoned.

[51] Int. Cl.⁵ .............................................. A01K 63/04
[52] U.S. Cl. ..................................... 210/151; 210/169; 210/416.2; 119/5
[58] Field of Search ............ 210/150, 151, 169, 416.2; 119/5

[56] References Cited

U.S. PATENT DOCUMENTS

| | | | |
|---|---|---|---|
| 2,594,474 | 4/1952 | McGrath | 119/3 |
| 3,468,288 | 9/1969 | Cassil | 210/169 |
| 3,540,591 | 11/1970 | Yamazaki | 210/169 |
| 3,687,291 | 8/1972 | Willinger | 210/169 |
| 3,768,651 | 10/1973 | Streeter | 210/169 |
| 3,774,766 | 11/1973 | Brock | 210/169 |
| 3,835,813 | 9/1974 | Katz | 210/169 |
| 3,983,843 | 10/1976 | Johnson | 210/169 |
| 4,265,751 | 5/1981 | Willinger | 210/169 |
| 4,622,148 | 11/1986 | Willinger | 210/169 |
| 4,684,462 | 8/1987 | Augustyniak | 210/169 |
| 4,714,547 | 12/1987 | Willinger | 210/169 |
| 4,844,013 | 7/1989 | de Haan et al. | 119/5 |
| 4,894,149 | 1/1990 | Block | 210/169 |
| 4,895,646 | 1/1990 | Willinger | 210/169 |
| 4,915,828 | 4/1990 | Meyers et al. | 210/169 |
| 4,936,981 | 6/1990 | Baisley et al. | 210/169 |
| 4,966,096 | 10/1990 | Adey | 119/5 |
| 4,988,436 | 1/1991 | Cole | 210/169 |
| 5,006,230 | 4/1991 | Votava, III et al. | 210/169 |
| 5,062,950 | 11/1991 | Shieh | 210/169 |

OTHER PUBLICATIONS

The Marine Aquarium Reference by Martin A. Moe Jr. Pub. 1989, pp. 232-271.

Primary Examiner—Peter Hruskoci
Assistant Examiner—Robert James Popovics
Attorney, Agent, or Firm—Helfgott & Karas

[57] ABSTRACT

An aerobic filter which comprises a chamber for holding a medium for aerobic bacterial growth. The chamber is positioned to receive filtered water from a primary file which at least physically filters contaminated aquarium water. The chamber is also positioned to be at least partially out of the aquarium water to provide oxygenation of the aerobic bacteria to enhance their growth, and to directly return the aerobically filtered water to the aquarium.

12 Claims, 4 Drawing Sheets

AEROBIC AQUARIUM FILTER CHAMBER

This is a continuation of application Ser. No. 07/562,081, filed Aug. 2, 1990, now abandoned.

BACKGROUND OF THE INVENTION

This invention relates to aquarium filtration, and more particularly to improvements in the biological filtration of aquarium water. In addition, this invention relates to an aerobic chamber which is used in conjunction with a primary aquarium filter to enhance the removal of wastes from the aquarium water and which discharges the aquarium water directly into the aquarium.

Whenever aquatic animals are to be maintained within an aquarium environment, the quality of the water in which they live must be maintained at a suitable level. In addition to properly controlling the temperature, dissolved oxygen and other water qualities, the toxic material content of the water must be maintained at a sufficiently low level to prevent harm to the fish.

The main source of contaminants within an aquarium are the aquatic animals themselves. The metabolic waste of the aquatic animals is stored within the aquarium. In high concentrations, these waste products become toxic to the same animals that produce them.

To combat the problem of toxic waste build-up, three types of filtration approaches are generally utilized. One approach is physical filtration wherein the suspended waste material is physically trapped by mechanical filters. The filters utilize filtration material in the form of particles of gravel, or fluffy masses of synthetic resin fibers. Sand or gravel beds are well known materials which are also used in undergravel type of filters performing such mechanical filtration.

The second well known type of filtration is chemical filtration which relates to the removal of or deactivation of mostly organics and any substance containing the element carbon. Activated carbon and ion exchange resins are commonly used materials. While the above forms of filtration are well known and frequently utilized, they are generally insufficient for purifying the water and eliminating some of the common known toxic waste products of the aquatic animals themselves.

The third type of filtration which is probably the most important and yet often least utilized, is that of biological filtration. Such biological filtration is accomplished by means of living organisms, primarily bacteria. The presence of these biologically active bacteria in an aquarium is essential, since they serve to rid the tank of toxic ammonia.

Examples of aquarium filters which provide physical, chemical and aerobic filtration are described in U.S. Pat. Nos. 4,512,885, 4,622,148 and 4,714,547 assigned to the assignee of the present invention.

Ammonia is a highly toxic substance harmful to many aquatic animals even if present in very low concentrations. Ammonia toxicity is pH sensitive. The higher the pH, the more toxic the ammonia becomes. Since marine aquariums generally maintain a higher pH than their fresh water counterparts, ammonia levels are of greater concern in the salt water aquarium. However, even in fresh water aquarium tanks ammonia can build up to high levels and cause toxicity to the water.

Ammonia is generated by the animals themselves which excrete ammonia directly. Additionally, ammonia is the end product of decaying organic matter such as uneaten food, dead animals, and feces. The ammonia is removed from the aquarium through biological filtration by a process called "nitrification". Nitrification is a two step process which requires two different types of bacteria to perform each step. These two types of bacteria are referred to as nitrifiers or nitrifying bacteria.

The first step in this sequence is performed by bacteria of the type Nitrosomonas. These bacteria remove ammonia from the water and, through biological oxidation, convert it to a different substance, nitrite. While nitrite is generally less toxic than ammonia, the removal of ammonia still does not provide adequate purification of the water. However, a different group of bacteria, the Nitrobacter bacteria quickly act on the nitrite and convert it further to nitrate, which is harmless to the aquatic inhabitants.

Both of these types of bacteria are of the aerobic form. However, even anaerobic bacteria are useful in reducing the ammonia, although they produce different end products, some of which are toxic to aquatic life. By maintaining an adequate supply of oxygen to the aquarium, the anaerobic bacteria can be kept in check and adequate aerobic bacteria are provided.

The aerobic nitrifying bacteria have two basic requirements to carry out their functions. The first is the need for adequate oxygen concentrations. The second is that they require a place to attach themselves.

Prior art filters which provided enhanced aerobic filtration were complex, large and expensive devices. These filters referred to as wet/dry filters include a chamber providing mechanical filtration, being the wet part, and an aerobic chamber being the dry part because of the large amounts of oxygen in the aerobic chamber. Typically, the prior art wet/dry filters require two pumps, one to draw aquarium water into the primary filter and one to pump the aerobically filtered water back into the aquarium. In addition the prior art filters required a balance between the input to the filter and the output of the filter to avoid either overflowing the aerobic chamber or not having sufficient water for the pump returning the water to the aquarium to operate efficiently. It also required collection of the water dripping through the aerobic chamber to provide an adequate amount to support the return pumping of the water back to the aquarium.

While previous filters have in fact provided primary and aerobic filtration, still further enhancement and improvement of aerobic filtration is desirable. These enhancements and improvements would be particularly beneficial if the aerobic filtration supplements the filtration of the primary filter which provides physical filtration together with chemical filtration, and discharges directly into the aquarium, thereby eliminating the need for multiple pumps and balancing the output of the primary filter with the output of the aerobic filter, and permitting a less costly and simplified aerobic filter arrangement. In addition, the aerobic filters should have large surface areas for the aerobic nitrifying bacteria to attach themselves to and have sufficient oxygen concentrations to permit optimum growth of the bacteria.

SUMMARY OF THE INVENTION

Accordingly it is an object of the present invention to provide an improved aerobic filter.

A further object of the present invention is to provide an aerobic filter to receive the output of a primary filter to enhance biological filtration of the water returning to the aquarium, and to discharge the aerobically filtered water into the aquarium.

A still further object of the present invention is to provide an aerobic filter which is integral with a primary filter, adds an additional step of biological filtration of the aquarium water and discharges into an aquarium.

Still another object of the present invention is to provide an aerobic filter with means for causing the aquarium water to drip through the filter to enhance the opportunity for bacterial growth.

Another object of the present invention is to provide an aerobic filter which is at least partially not submerged in water during use so as to enhance the oxygenation of the environment supporting bacterial growth.

Still another object of the present invention is to provide an aerobic filter which has coupling means to permit it to be coupled to the output of a primary filter, whereby the primary filter is referred to as a wet filter and the aerobic filter is referred to as a dry filter to thereby provide a wet/dry aquarium filter.

Still another object of the present invention is to provide an aerobic filter which may house various media to maximize bacterial growth and includes further oxygenation means.

Still another object of the present invention is to provide an aerobic filter which includes additional chemical filtration means.

Briefly in accordance with the present invention, an aerobic chamber is provided through which aquarium water passes. The chamber houses growth media such as thermoplastic tubules, to provide a large surface area to which the aerobic bacteria can attach themselves, grow and proliferate. The chamber is positioned with respect to the aquarium so that it is at least partially out of the water so as to surround the growth media and bacteria with air and thereby oxygenate the aerobic bacteria to enhance their growth and keep the anaerobic bacteria in check.

In one embodiment, a dispersing means is provided to cause the aquarium water to drip through the filter to avoid washing away bacteria and give more time for the bacteria to act upon the toxic wastes. The aerobic chamber may either be integral with or attachable to a primary filter with the output of the primary filter flowing to the aerobic chamber. In a preferred embodiment the filter has two chambers with physical and/or chemical filtration in the primary chamber and biological filtration in the aerobic chamber.

In an alternate embodiment, additional air is pumped into the aerobic chamber to provide further oxygenation of the bacteria and a chemical filter such as activated carbon is added.

BRIEF DESCRIPTION OF THE DRAWINGS

Figure 1:
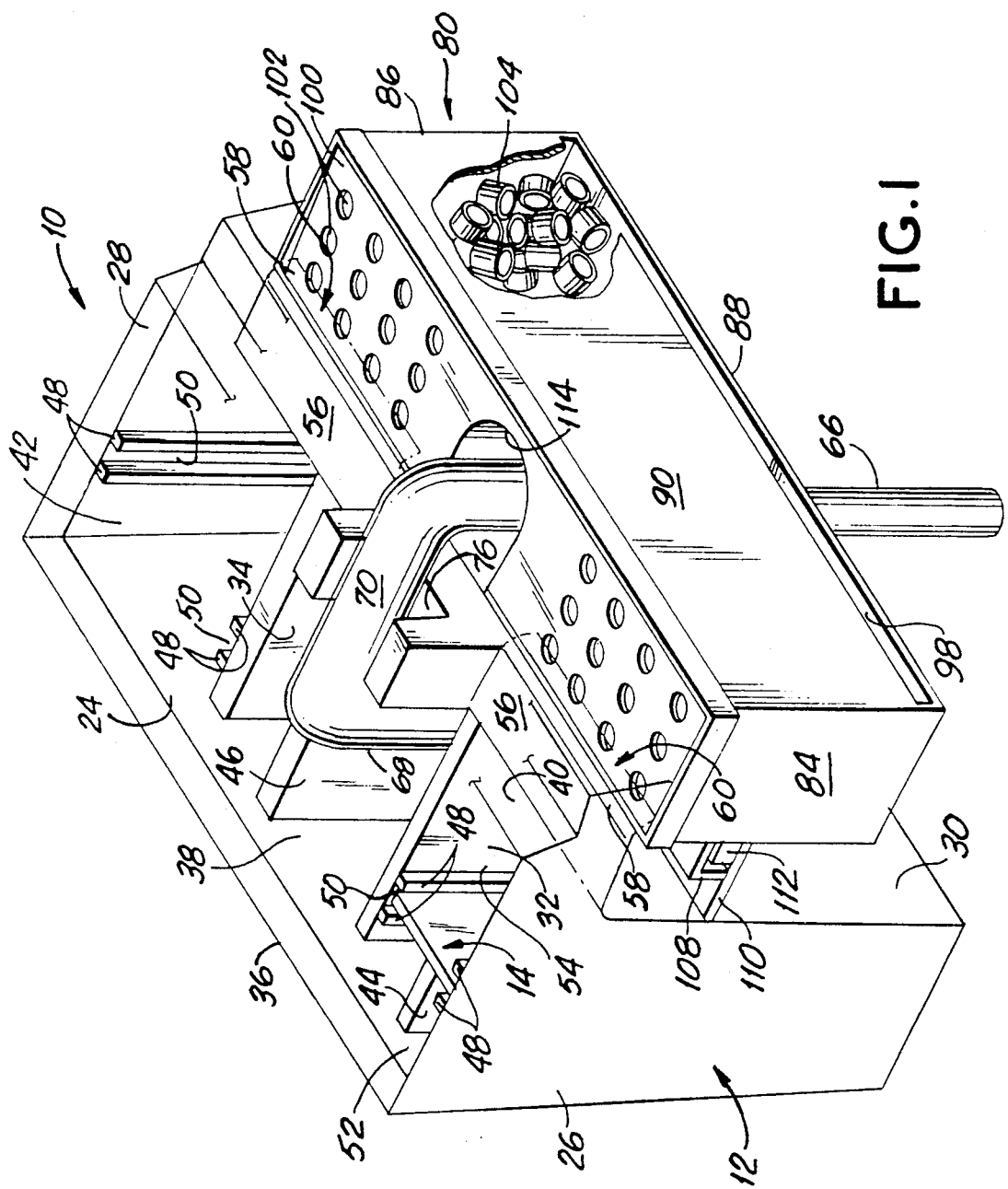
Figure 3:
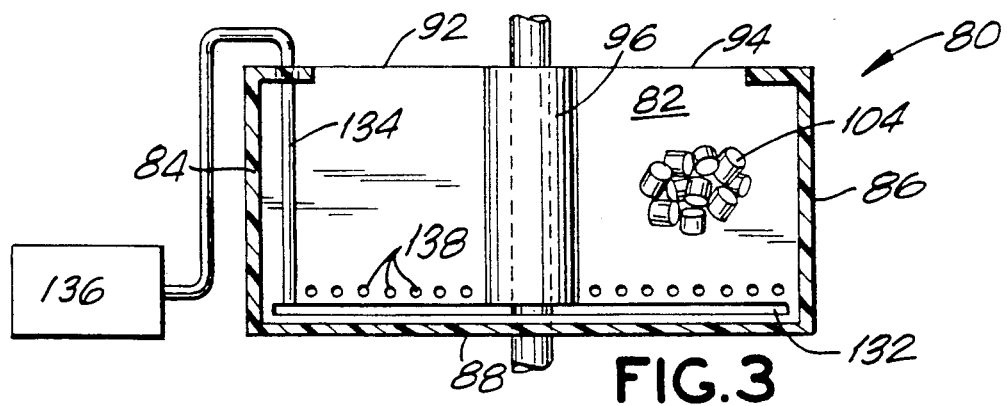
Figure 4:
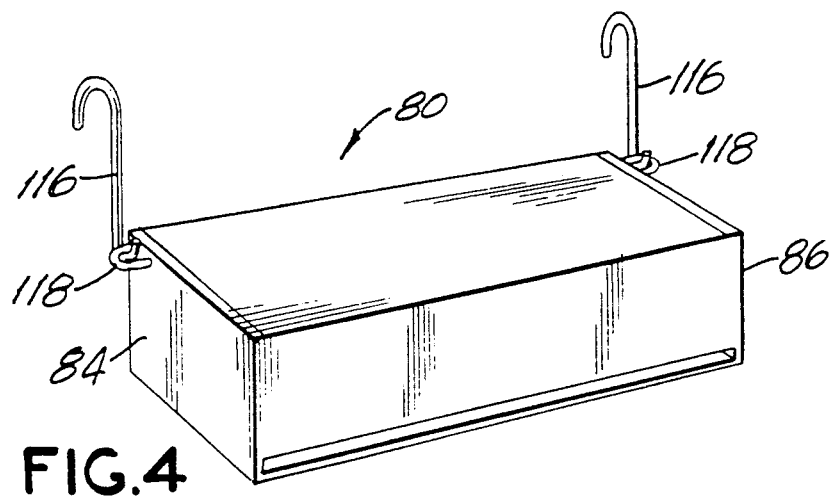
Figure 2:
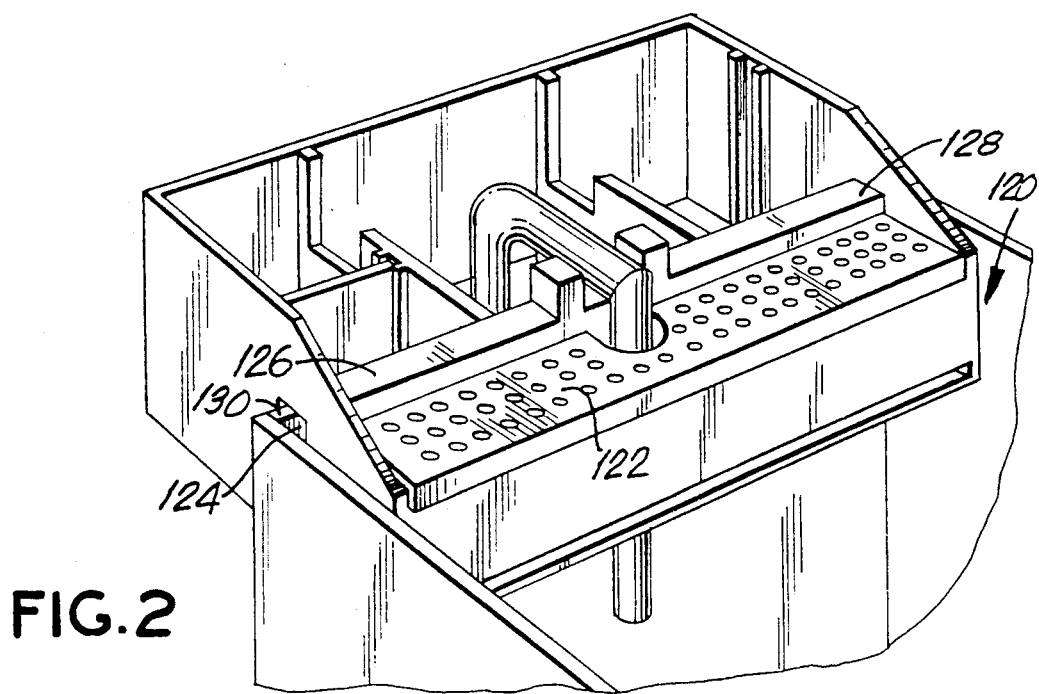
Figure 5:
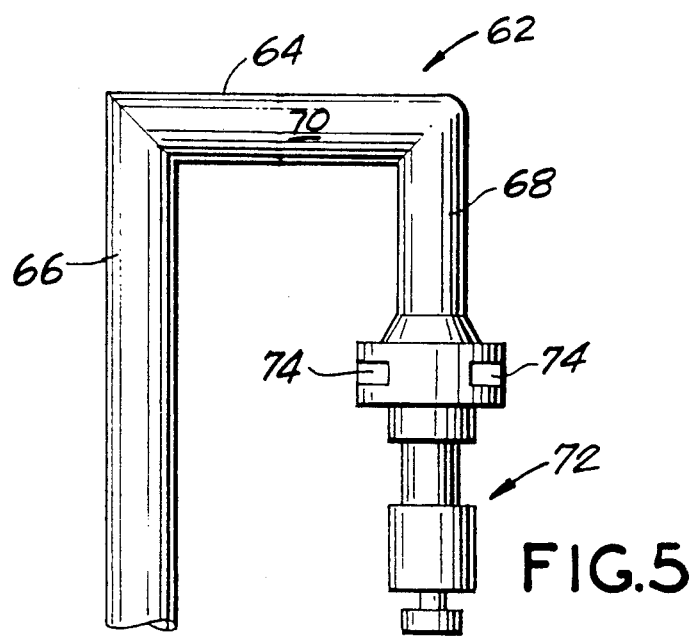
Figure 6:
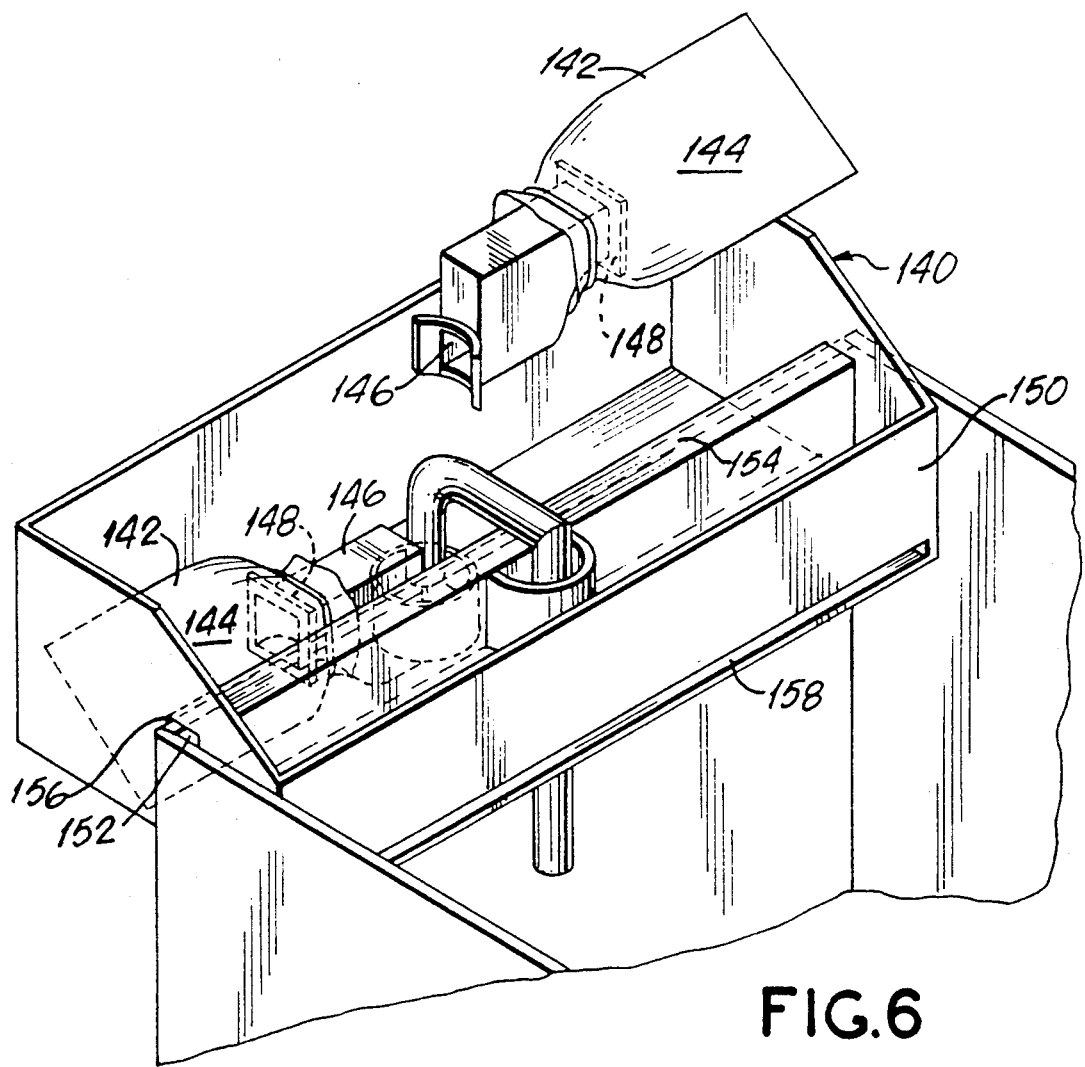
Figure 7:
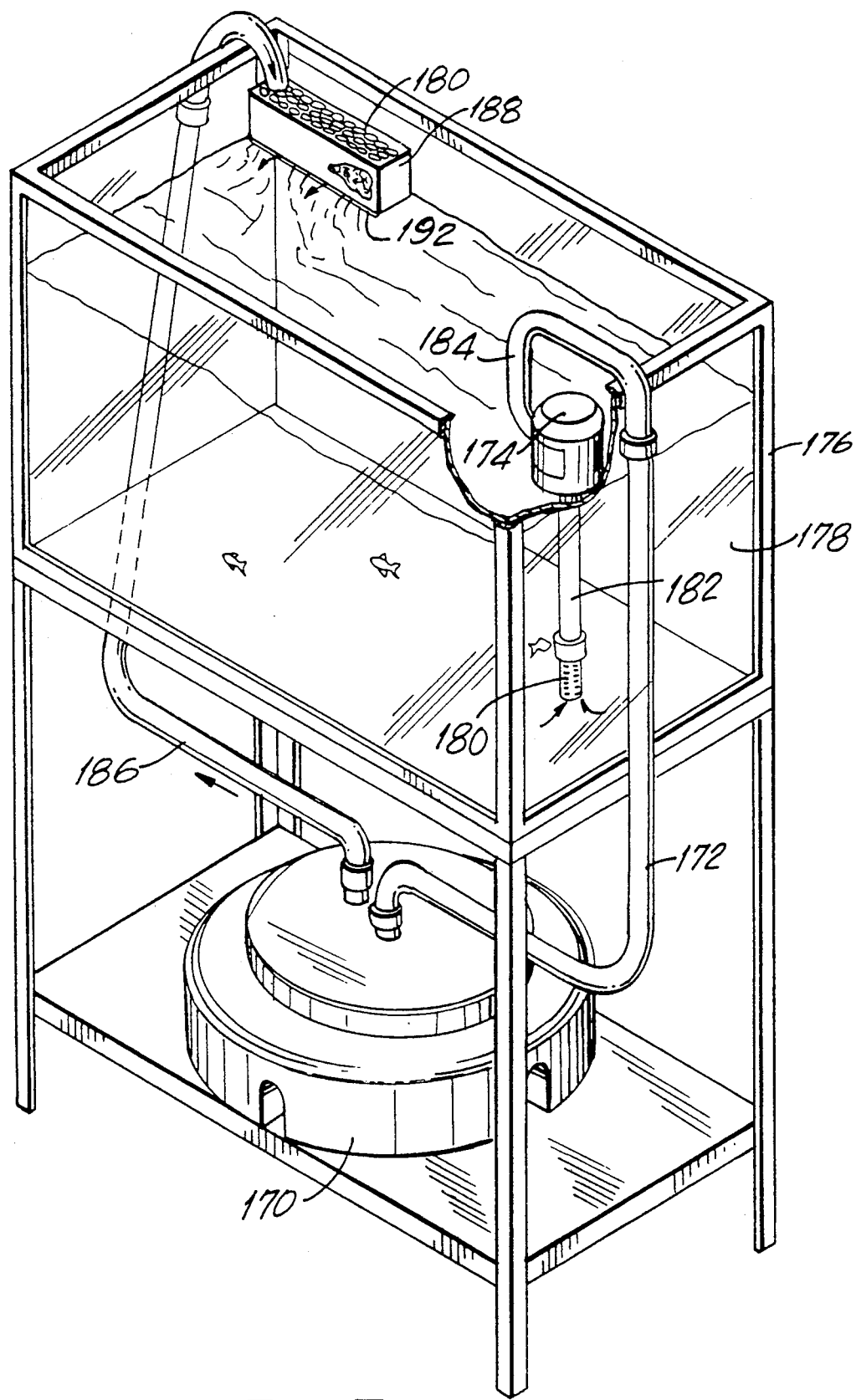

IN THE DRAWINGS:

FIG. 1 is a perspective view of an aquarium filter showing an aerobic chamber attached to a primary filter and positioned to receive the output of the primary filter;

FIG. 2 is a perspective view of an aquarium filter having a primary and an aerobic chamber in which the aerobic chamber receives the output of the primary chamber;

FIG. 3 is a vertical sectional view of the aerobic chamber shown in FIG. 1 with means for adding additional oxygen to the chamber and for chemical filtration;

FIG. 4 is a perspective view of an aerobic chamber showing a means for attaching the chamber to a primary filter;

FIG. 5 is a schematic view of a motor and tube for pumping water from an aquarium into a filter;

FIG. 6 is a view of another embodiment of the present invention wherein primary filtration is accomplished by feeding water into an enclosed filter bag; and FIG. 7 is a perspective view showing use of the aerobic chamber in conjunction with a canister filter.

In the various figures of the drawings, like reference characters designate like parts.

DETAILED DESCRIPTION OF THE PREFERRED EMBODIMENT

Referring now to the drawings, in FIG. 1 there is shown an aquarium filter apparatus which is designated generally by the number 10 and comprises a tank 12 into which are placed sheets of filter material 14.

More particularly, the tank 12 which is typically formed of transparent plastic material, has a substantially rectangular configuration having a rear wall 24, opposing side walls 26, 28, and a front wall 30. Intermediary walls 32, 34 extend from the front wall 30 to the rear wall 24. The tops of the intermediary walls 32, 34 terminate at a point lower than the upper edge 36 of the rear wall 24. The intermediary walls 32, 34 separate the tank into an intake receiving chamber 38 positioned between the intermediary walls and filtering chambers 40, 42 in which primary filtration takes place. The intermediary walls 32, 34 each have sections 44, 46, respectively, which are shorter than the remainder of the walls and extend only the partial height of the rear wall 24. The shorter sections 44, 46 also terminate on the rear wall at a point below the upper edge of the front wall 30. This permits the water in the intake chamber 38 to flow over the wall sections 44, 46 and into the filtering chambers 40, 42. A more detailed description of a primary filter as described with respect to the preferred embodiment is set forth in U.S. Pat. No. 4,512,885 entitled Aquarium Filter Assembly, the entire contents of which is herein incorporated by reference.

Intermediary walls 32, 34 and opposing side walls have ribs 48 formed thereon which define channels 50 for receiving filters 14. A filter 14 is shown positioned in filtering chamber 40 and held in place by ribs 48. Although filtering chamber 42 also receives a filter 14, the filter has not been shown for clarity of the drawings. Filter 14 is a physical filter which physically traps suspended waste. Filter 14 may, for example, be an envelope or container formed of any suitable material and may be constructed of synthetic resin fibers in a random or non-woven pattern. The advantage of an envelope is that a chemical filter such as activated carbon and a biological filter such as thermoplastic tubules to support aerobic filtration may be included in the envelope. An example of a filter envelope which provides physical, chemical and biological filtration is described in U.S. Pat. No. 4,714,547 assigned to the assignee of the present invention, the entire contents of which is herein incorporated by reference.

The compartment formed between the rear wall 24 and each filter 14 is hereafter referred to as the unfiltered water chamber and the compartment 54 formed forward of each filter 14 is hereafter referred to as the filtered water chamber. It should be noted that the filter 14 substantially fills the entire height of the tank 10. The upper ends of the front walls 30 in each filtered water chamber terminate in a horizontal ledges 56 which becomes downwardly directed, arcuately shaped forward walls 58 which form spillways 60 for water flowing from the filtered water chambers 54 back into an aquarium tank. The height of the spillways 60 is less than the height of the rear wall 24 so that all water exits through the spillways.

The tank 10 has a removable intake assembly shown in FIG. 5. The intake assembly shown generally as 62 comprises a substantially U-shaped intake flow tube 64 including a first vertical leg 66 and a second vertical leg 68 interconnected by a connecting leg 70. The intake assembly is connected to a standard type of motor generally designed as 72. The motor has stator laminations which through magnetic coupling rotate an impeller which draws contaminated water up through the leg 66, through leg 70 and down through leg 68 and out through outlets 74.

The intake assembly is positioned with the vertical leg 66 depending into an aquarium tank (not shown) and the connecting leg 70 held in place by a U-shaped notch 76 formed between the horizontal ledges 56 in the upper end of the front wall. Vertical leg 68 which is connected to the motor 72 is positioned in the intake receiving chamber 38 so that contaminated aquarium water is drawn into the intake chamber through outlets 74 positioned beneath tube 68.

Referring to FIG. 1, there is shown an aerobic chamber generally designated as 80 which incorporates the principles of the present invention. The aerobic chamber may be made of any suitable material such as a transparent plastic material and has a rectangular configuration having a rear wall 82, opposing side walls 84, 86, a bottom wall 88 and a front wall 90. Referring additionally to FIG. 3, the rear wall 82 of the chamber 80 is divided into a first section 92 and a second section 94 which are interconnected by a U-shaped section 96. The U-shaped section 96 forms a passageway which permits leg 66 of the tube assembly 62 to extend downward into the aquarium. Front wall 90 terminates above bottom wall 88 to provide a return 98 through which aerobically filtered water can flow back to the aquarium.

A dispersion plate 100 having numerous holes 102 sits on top of the aerobic chamber 80 and as will be more fully described sets the drip rate into the chamber. In the chamber, there is positioned material for supporting the growth of the bacteria. Preferably the material should provide a large surface area for the bacteria to attach themselves to and permit the easy flow of air to oxygenate the bacteria. One such material shown in FIGS. 1 and 2 is thermoplastic tubules 104. The thermoplastic tubules are thin walled and are of small size, thereby providing a large surface area for any given volume of space.

An alternate to adding a growth supporting medium for the bacteria, is to form chamber 80 with multiple walls interconnecting the chamber walls to provide circuitous paths and grooves. The paths and grooves will provide a large surface area on which the bacteria can attach.

The chamber 80 is positioned to receive the output of a primary filter by a suitable mechanism. One such mechanism is shown in FIG. 1 which attaches chamber 80 to the front wall of tank 10 by an L-shaped bracket 108 which is attached to and extends horizontally across the back wall 82 of chamber 80. The front wall 30 of tank 10 has a horizontal spacer 110 extending horizontally across the front wall. A horizontally extending elongated rectangular block 112 extends along the length of the spacer 110. Chamber 80 is attached to tank 10 by placing the L-shaped bracket 108 over block 112. The bracket 108 is positioned so that chamber 80 sits below the spillways 60 to receive the water from the primary filter. U-shaped section 96 accommodates and surrounds tube 66. Dispersion plate 100 is also provided with a U-shaped section 114 to accommodate tube 66.

The primary filter receives contaminated water from an aquarium after the motor 72 is energized. The contaminated water is drawn up through tube 66 into the intake chamber 38 which fills to a point where the water overflows the shorter section 44, 46 of the intermediary walls into the filtering chambers 40 and 42. Specifically, the contaminated water flows into the unfiltered water chamber behind filters 14 and then through the filters 14. Filters 14 physically filter out contaminants and the water flows into the filtered water chambers forward of the filters.

The filter 14 in addition to being made of a fluffy mass of synthetic resin which traps waste material, may be in the form of an envelope into which a chemical filter such as activated carbon may be placed to remove or deactivate organic waste. Additionally, a medium such as a plastic frame which holds and supports the filter in place in the channels 50 may be placed into the envelope to support aerobic bacteria growth. The aerobic bacteria may be further enhanced by placing a medium such as thermoplastic tubules in the envelope. Accordingly for purposes of this description, the primary filter provides physical, chemical and aerobic filtration.

The aerobic filtration while helpful, is not optimized since the water flows through the envelope dislodging some of the bacteria. Furthermore, since the filter is submerged in water, the air to which the bacteria are exposed is somewhat minimized. In addition, the amount of tubules that can be put in the envelopes is somewhat limited thereby limiting the surface area for the bacteria to attach to.

As the level in the filtered water rises it flows over the spillways 60 and onto the dispersion plate 100. The holes 102 in the dispersion plate control the flow rate into the aerobic chamber 80. The holes are sufficiently small in size and their number chosen to provide a dripping of the water into the chamber 80. The rate is chosen so that the flow of water over the tubules 104 does not wash off the bacteria and the tubules are covered by thin sheets of highly oxygenated water which in turn oxygenate the bacteria to enhance their growth. The tubules or other growth media in the chamber dedicated to aerobic filtering are sufficient in number to provide a large surface area for the bacteria to grow on. Because there are such large amounts of oxygen in this aerobic filter it is referred to as a dry filter. By comparison, the primary filter has flowing water therethrough so it is referred to as a wet filter. The combination results in a wet/dry aquarium filter.

To optimize the aerobic filtering for a particular primary filter, a variety of dispersion plates which provide differing drip rates may be used. Since the flow from each primary filter will vary, a particular dispersion plate may be better suited to provide dripping.

The water which drips through the aerobic chamber and is bacteriologically filtered, flows directly by gravity into the aquarium through return 98. Since the dispersion plate may limit the amount of water entering chamber 80 in a given period of time, excess flow coming over the spillways 60 which can not enter chamber 80 may flow over the dispersion plate and return to the aquarium.

One mechanism was described for attaching chamber 80 to the primary filter. The primary filter included the spacer 110 and block 112 as part of a mechanism for attaching an optional aerobic filter to the primary filter. With respect to primary filters which do not have a mechanism for attaching an optional filter, a set of elongated S-shaped hooks 116 may be inserted in lobes 118 molded into the sides 84 and 86 of the chamber (FIG. 4). The S-hooks may be hung over, for example, the spillway of a primary filter to position the chamber to receive water from the primary filter. The arrangements for attaching an adjunct filter to a primary filter are numerous and the S-hooks are only one example.

In FIG. 2, there is shown the primary filter described with respect to FIG. 1 with an aerobic chamber 120 integrally molded with the primary filter. In this embodiment dispersion plate 122 has been optimized to provide an appropriate drip rate. In all other respects, the aerobic chamber functions as does the adjunct optional chamber 80. A channel 124 is molded under spillways 126 and 128. The channel mounts on the upper edge 130 of an aquarium side. It should be noted that in all configurations of the aerobic chamber, the chamber is positioned at least partially and preferable wholly out of the aquarium water to provide a, aerobic filtration.

Referring to FIG. 3, there is shown another embodiment of the invention with enhanced oxygenation. The enhancement is achieved by blowing air into the chamber. One way of providing such air is to use a porous stone 132 which is suitably attached to an air hose 134 which is attached to an air pump 136. The air enters the porous stone, also called an air stone, and is diffused through the stone into the chamber. An additional further chemical filtration may be accomplished by adding a substance such as activated carbon 138 to the chamber.

In FIG. 6 there is shown another type of primary filter 140 which uses filter bags 142 for receiving a continuous supply of contaminated water usually under a predetermined pressure. The walls 144 of the bags are made at least partially of a porous filter membrane formed of a matrix of pressure displaceable fibrous material. A complete description of the filter bags is set forth in U.S. Pat. No. 4,622,148 assigned to the assignee of the present invention, the entire contents of which are herein incorporated by reference.

Briefly, as the contaminated water exits pump outlets 74 (FIG. 5), the water enters ports 146 which are suitably attached to mouths 148 of the bags 142. Ports 146 are suitably secured over outlets 74 to receive the contaminated water and feed it into bags 142.

In use as the filter bags 142 clog with contaminants, bacterial growth and accompanying by products, the fibrous material is displaced to increase the size of the interstices of the matrix to permit water to continue to flow through the interstices and continue filtering. However, when the bags get too clogged, they just stop filtering and prevent further flow of the water. This is an improvement over the bags of FIG. 1 wherein, when the bags get clogged, the water might overflow the filter.

In all other respects, the filter is the same as that described with respect to FIG. 2. The aerobic chamber 150 is integrally molded with the primary filter 140 and has a channel 152 molded under spillway 154. The channel 152 mounts on the upper edge 156 of an aquarium side. Water exiting the primary filter flows over the spillway 154 onto a dispersion plate (not shown) and drips into aerobic chamber 150 over bacteria growth media (e.g. tubules—not shown). The aerobically filtered water enters the aquarium directly by gravity from chamber return 158.

Referring now to FIG. 7, there is shown a further example for the use of the aerobic chamber wherein it is utilized in conjunction with a canister filter. Specifically, there is generally shown a canister filter 170 having a housing in which would be contained filtration material. An inlet tubing 172 is coupled to an immersible water pump 174 positioned in the aquarium tank 176 and below the water level 178. The water pump draws water through the strainer 180, the inlet pipe 182 and into the water inlet of the water pump. The outlet of the water pump is connected through the coupling tubing 184 to the inlet tubing 172. The particular arrangement of having a water pump separated from the canister filter is the subject of copending application Ser. No. 07/562,084 filed concurrently herewith and entitled External Aquarium Filter, and assigned to the Assignee of the present invention.

It should be appreciated, however, that other aquarium canister filters could be utilized either wherein the water pump is connected directly to the canister housing or even through the use of an air pump to draw water up through the return tubing.

The output from the canister filter is fed back to the aquarium through the outlet tubing 186. Normally, this would be fed directly into the aquarium tank. In the present invention, the aerobic chamber 188 is coupled to the aquarium tank or suspended from the outlet tubing so that it is positioned with at least a portion of the aerobic chamber above the water level of the tank. The aerobic supporting material 190 such as the tubules are placed in the aerobic chamber. The water drips through the aerobic chamber 188 and leaves through the outlet 192.

In all embodiments, the aerobic chamber is a chamber with the bacterial growth medium at least partially out of, and preferably wholly out of, the aquarium water. The growth medium provides a large surface area for the bacteria to attach themselves to, and oxygenation increases the growth of the aerobic bacteria and holds the growth of the aerobic bacteria in check.

There has been described a preferred and alternate embodiments of the invention. However, it should be understood that various changes and modifications may be made thereto without departing from the spirit and scope of the invention.

What is claimed is:

1. An aerobic filter for biological filtration of contaminated aquarium water in an aquarium tank in combination with a filter for physical filtration of aquarium comprising:
   means containing a medium supporting bacterial growth;
   means for positioning at least part of the filter for physical filtration exteriorly of the aquarium tank;
   means for positioning at least a part of said medium containing means interiorly of the aquarium tank while maintaining at least a portion thereof in the air above the aquarium water;
   means for conducting the water exiting the filter for physical filtration to the medium containing means such that all of the exiting water will trickle through the medium by gravity and will be oxygenated as it passes therethrough;
pump means for pumping contaminated water from the aquarium tank into said filter for physical filtration; and
means for discharging water from said medium containing means into the aquarium tank by gravity.

2. The combination as in claim 1, wherein said means for positioning said medium containing means provides any excess water from the filter for physical filtration to flow over the medium containing means and directly into the aquarium tank.

3. The combination of claim 1, and further comprising:
dispersion means for dispersion means for distributing the flow of the water from the filter for physical filtration into the medium containing means to provide more uniform trickling through the medium.

4. The combination as in claim 3, wherein:
the medium containing means comprises a chamber; and the dispersion means comprises a plate with multiple holes which is positioned over the chamber; said holes being selected in number and size to cause the water to disperse through the chamber.

5. The combination as in claim 1, and further comprising means for chemical filtration.

6. The combination as is claim 1, wherein the filter for physical filtration is an external aquarium filter suspended externally from the walls of the aquarium tank.

7. The combination as in claim 1, wherein the filter for physical filtration is a canister filter.

8. The combination as in claim 6, wherein said means for conducting comprises a spillway for water overflowing said filter for physical filtration to flow into said medium containing means.

9. An aerobic filter for biological filtration of contaminated aquarium water in an aquarium tank in combination with a filter for physical filtration, comprising:
a filtering chamber positioned at least partly inside the aquarium tank;
dispersion means for distributing the flow of aquarium water into the chamber so that the water drips through the chamber;
means for coupling the filtering chamber to the filter for physical filtration so that the filtered water exiting the filter for physical filtration flows onto the dispersion means and therefrom drips into the chamber;
return means for directing water exiting the filtering chamber directly into the aquarium by gravity.
pump means for pumping contaminated water from the aquarium tank into said filter for physical filtration; and wherein
said attaching means provides that excess water from the filter for physical filtration will flow over the filtering chamber and will be discharged directly into the aquarium tank.

10. An aerobic filter as in claim 9, wherein:
the dispersion means is a plate with holes supported by the walls of the filtering chamber; and wherein said filtering chamber comprises a front wall and the return means is an opening in the front wall of the chamber.

11. A combined physical and aerobic filter for physical and biological filtration of contaminated aquarium water in an aquarium tank, comprising:
a filtering chamber containing means for physical filtering of aquarium water; said filtering chamber having a spillway through which the filtered water overflowing the filtering chamber exits;
pump means for pumping contaminated water from the aquarium tank into said filtering chamber;
an aerobic chamber containing a medium supporting aerobic bacterial growth and positioned to receive the filtered water exiting the spillway;
means for distributing the water entering the aerobic chamber for trickling through the medium;
means for attaching the combined filter to the aquarium tank, said attaching means positioning at least part of said aerobic chamber inside the aquarium tank at least partially out of the aquarium water, and for positioning at least part of said filtering chamber on the outside of the aquarium tank; and
means for feeding the water exiting the aerobic chamber directly into the aquarium tank by gravity.

12. A combined filter as in claim 11, wherein:
a physical filter is positioned in the primary filter so that the aquarium water passes through the filter; and
a medium for supporting bacteria growth is positioned in the aerobic filtering chamber so that the water entering the chamber trickles through the medium.

* * * * *